United States Patent Office 3,279,427
Patented Oct. 18, 1966

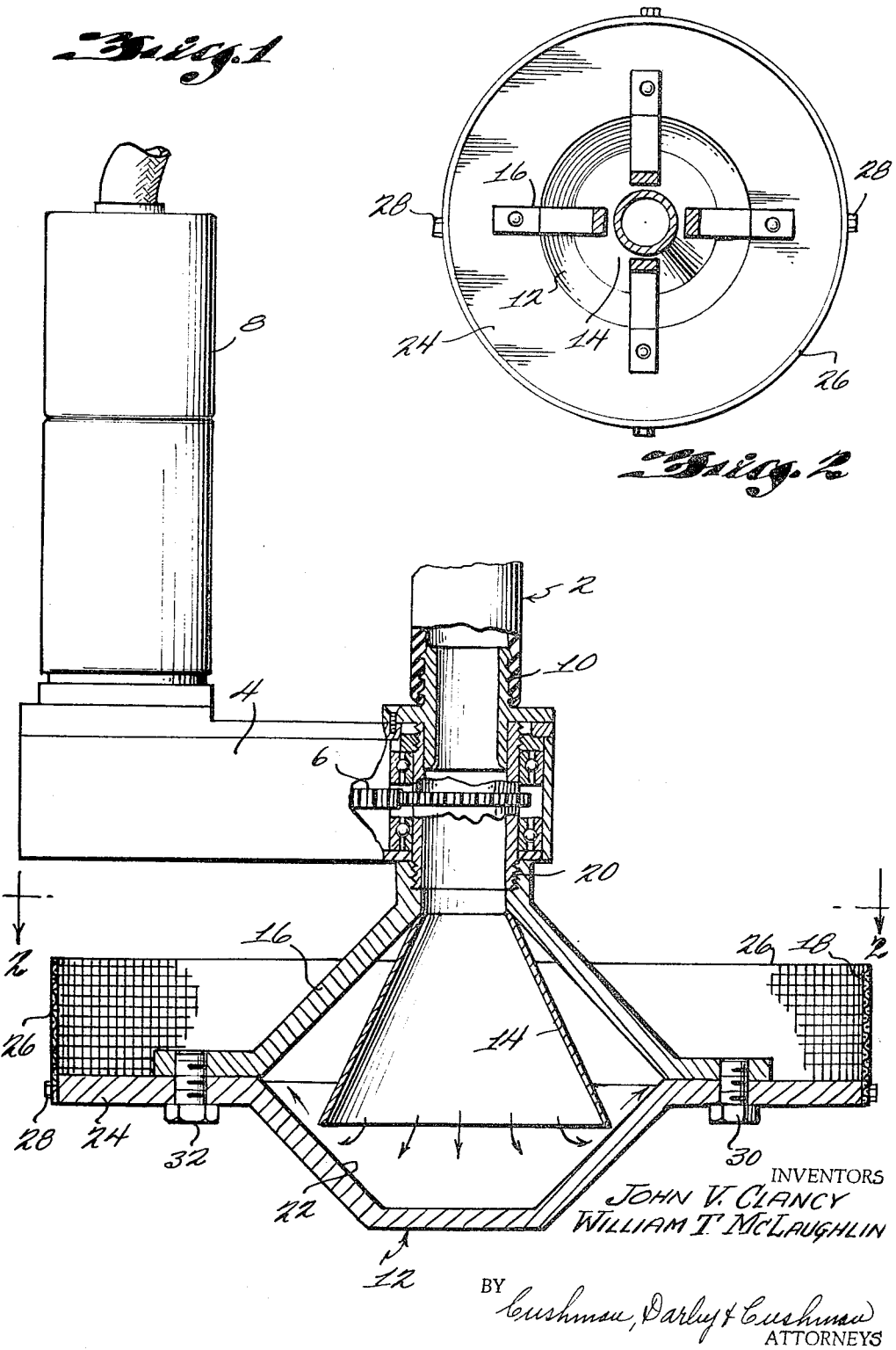

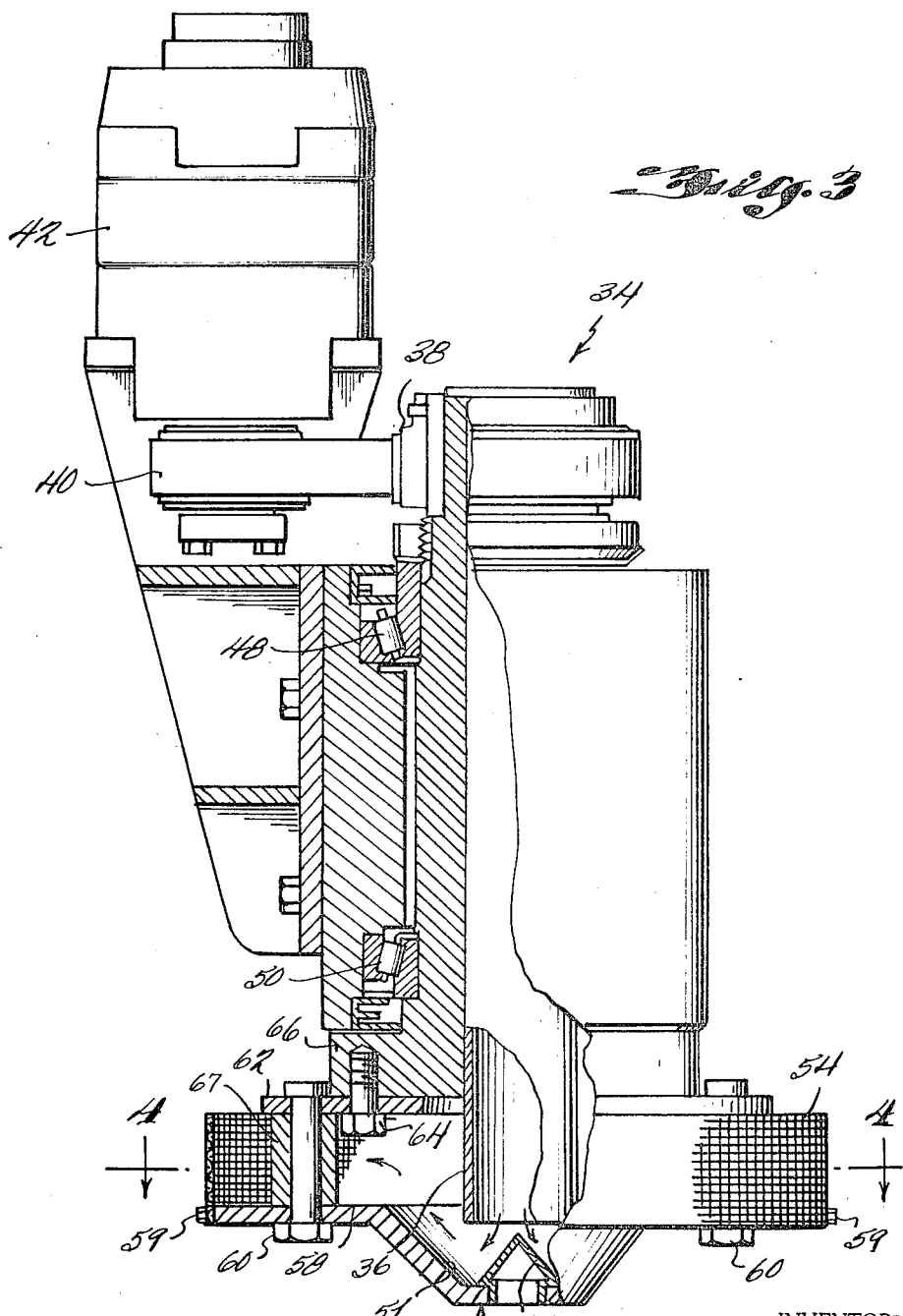

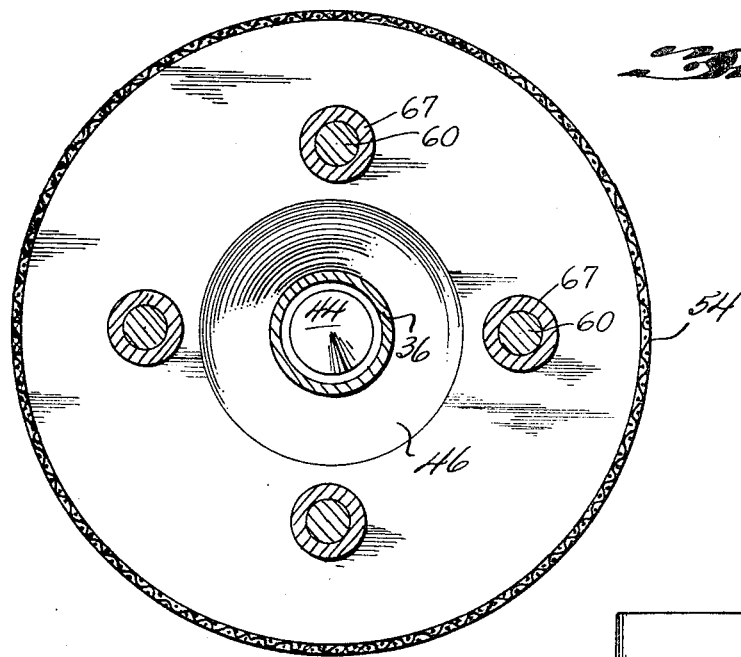
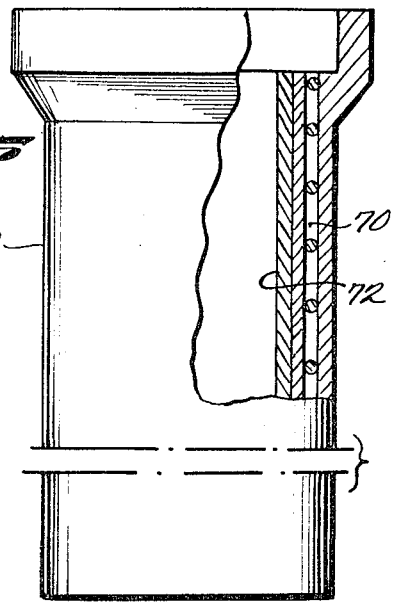
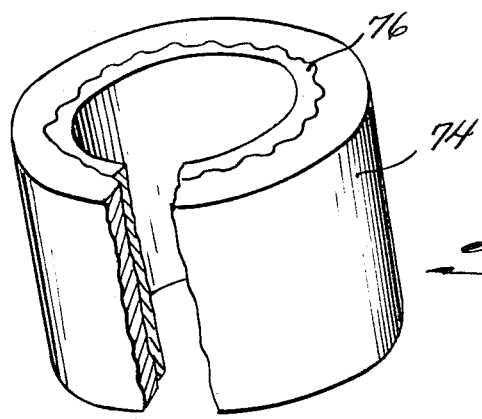

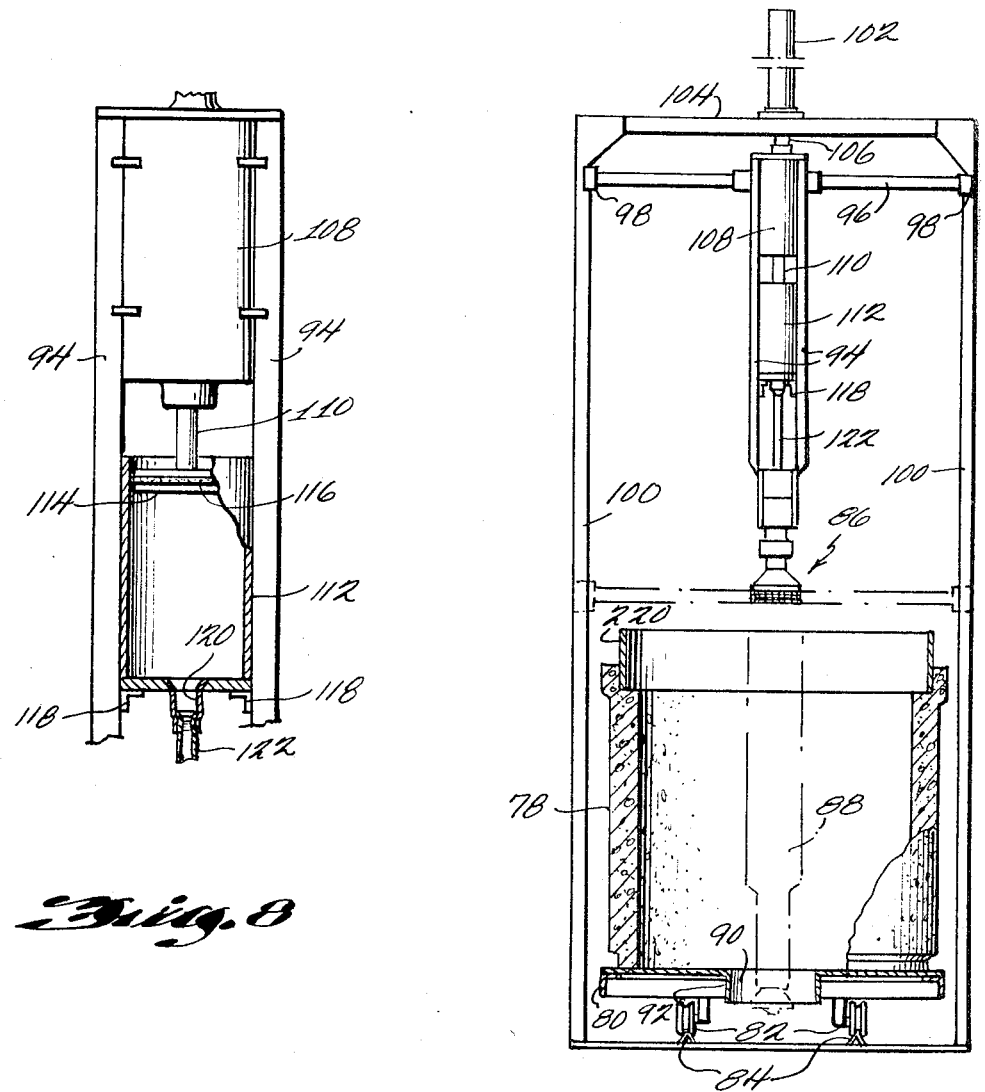

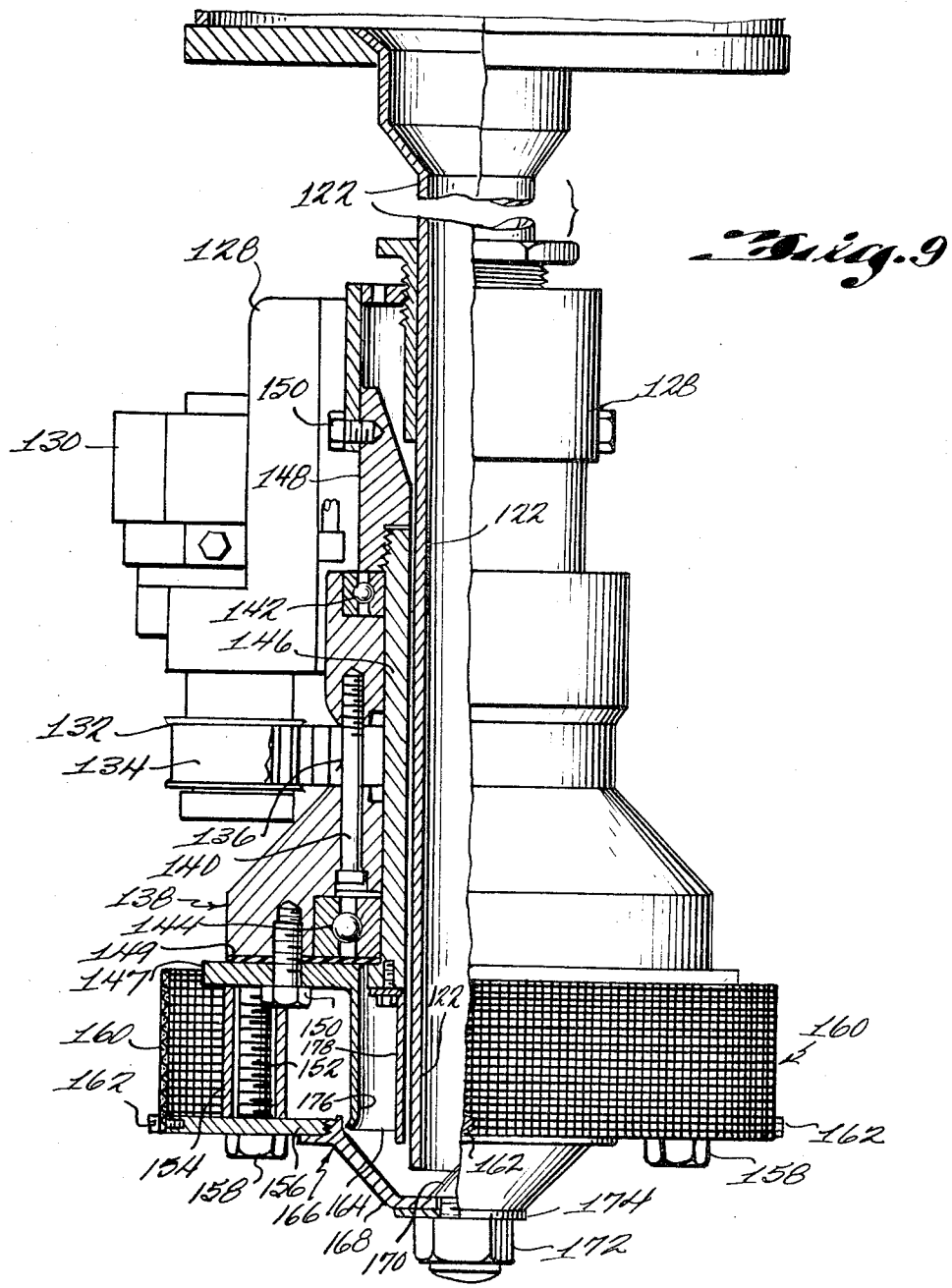

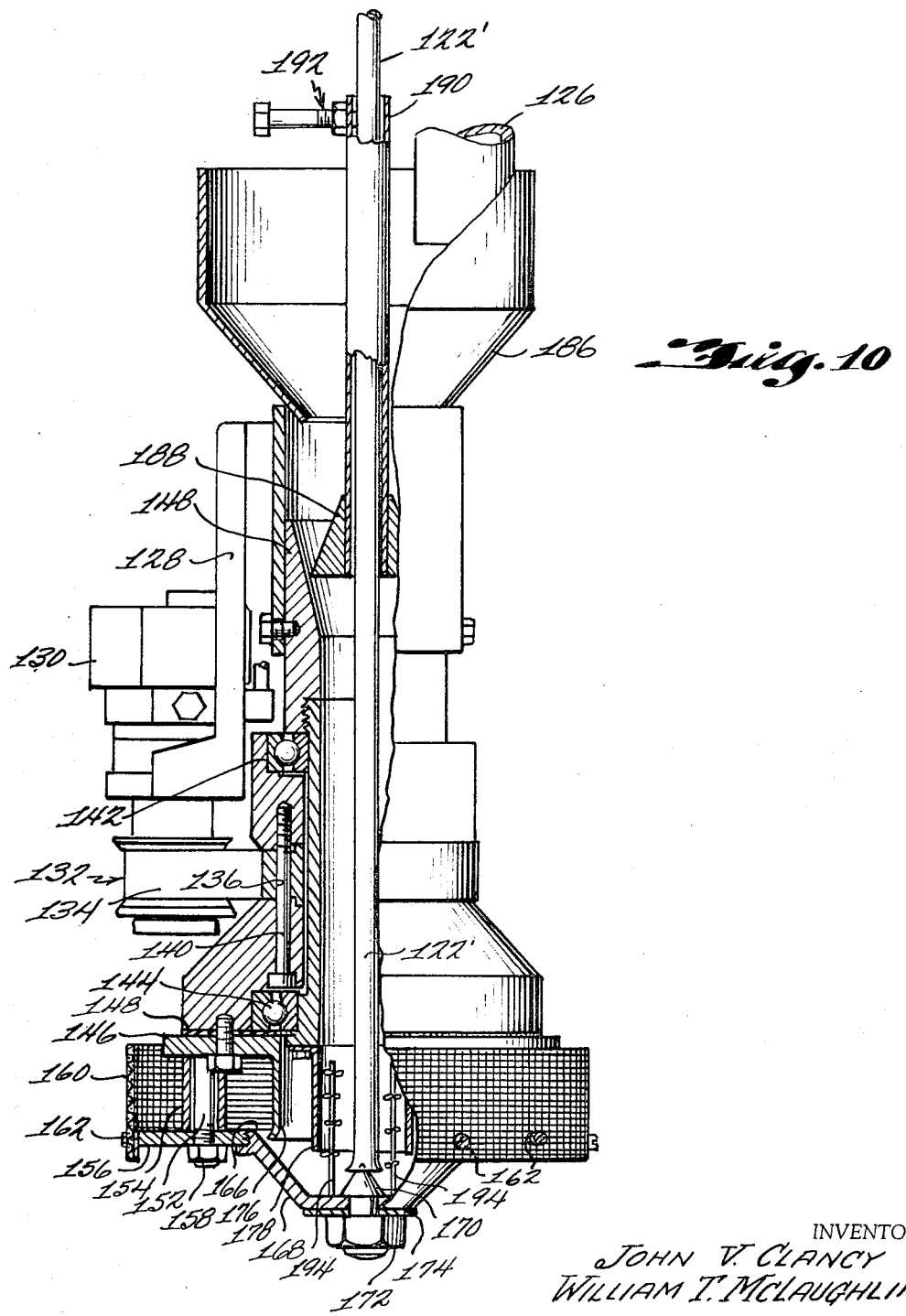

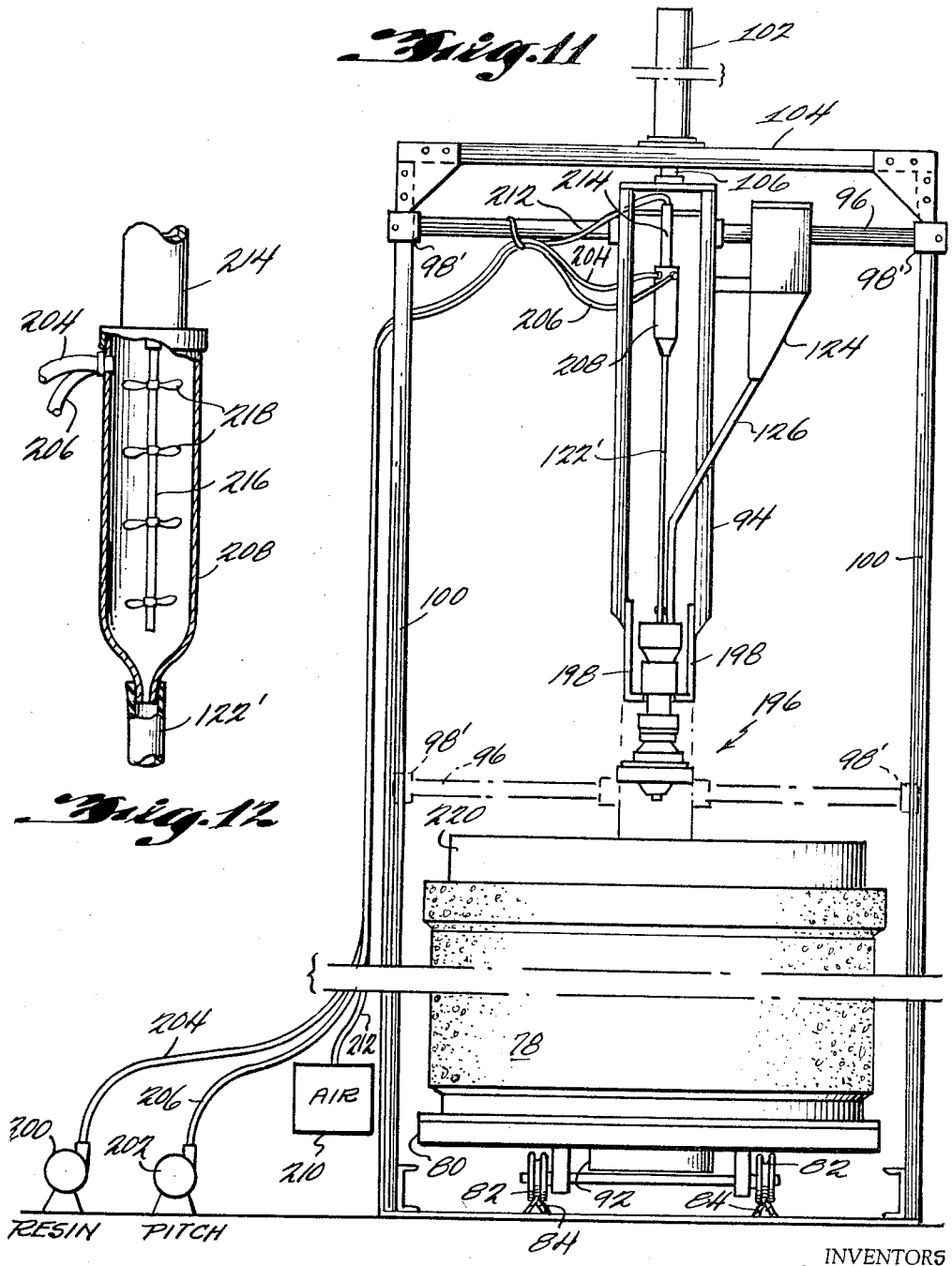

3,279,427
CENTRIFUGAL SPRAYING EQUIPMENT
John V. Clancy and William T. McLaughlin, Pittsburgh, Pa., assignors, by mesne assignments, to United States Steel Corporation, a corporation of Delaware
Filed Dec. 20, 1963, Ser. No. 332,229
19 Claims. (Cl. 118—317)

This application is a continuation-in-part of application Serial No. 330,416, filed December 13, 1963.

This invention relates to the preparation of an integral facing or barrier on the interior surface of concrete pipes, but especially to apparatus for effecting such facing.

Concrete pipes are frequently subjected to service conditions which cause attack on the inner surface of the pipe. Thus, hydrogen sulfide (and sulfuric acid formed therefrom) and other agents are released from water and sewage carried by such pipes. As a consequence, the art has turned to vitrified clay in place of concrete in making hydrogen sulfide resistant pipes. Unfortunately, vitrified clay is relatively expensive and does not have as good structural properties as desired, e.g., its compressive strength is not as high as desired.

Concrete pipes further suffer from the disadvantage of having rough, porous interior surfaces and of having inadequate abrasion resistance.

It is an object of the present invention to provide apparatus for effecting a continuous, integral facing or barrier for the interior surface of concrete pipe.

Another object is to provide such apparatus to prepare such a facing or barrier which is resistant to physical and/or chemical agents which attack concrete itself either by corrosion or erosion.

A further object is to provide economical apparatus for applying a protective facing or barrier to the interior surface of wet or green concrete pipe.

An additional object is to provide apparatus for effecting an integral facing for the interior surface of concrete pipe to provide a product giving at least as good protection against hydrogen sulfide and sulfuric acid as vitrified clay and which gives a product structurally superior to vitrified clay, e.g., it has better compressive strength.

Yet another object is to provide apparatus for imparting an abrasion resistant, non-porous, smooth facing to the interior surface of concrete pipe.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by our improved apparatus which spins a settable plastic composition onto the interior surface of a concrete pipe while the concrete is still in the wet, green or uncured stage, evenly with uniform thickness.

In one aspect of the invention, coal tar pitch, epoxy resin and sand are premixed and charged into a cartridge which via a conduit feeds into spin-off means including a spinnable deep-dish element or disk. This assembly is lowered inside a wet, uncured concrete pipe. Material is extruded out of the cartridge onto this disk. Centrifugal force throws the material against the pipe wall as the assembly is gradually raised through the center of the stationary pipe. There is a fusing or integration of the facing or barrier into the pipe itself.

The resulting product gives as good protection as vitrified clay and is structurally superior thereto. The conduit formed is not only resistant to hydrogen sulfide and sulfuric acid, but is abrasive resistant and presents a smoother surface than conventional concrete which has a rough texture.

Instead of utilizing a pitch-epoxy formulation, less preferably there can be employed an epoxy resin alone.

The apparatus according to this invention can effect a fully adhered, integrated surface-penetrating facing because of its unique configuration and operation.

The several disclosed embodiments of this invention will be best understood in connection with the accompanying drawings wherein:

FIGURE 1 is a view, partially in section, of one form of apparatus constructed in accordance with the invention;

FIGURE 2 is a view along the line 2—2 of FIGURE 1;

FIGURE 3 is a view, partially in section, of another form of apparatus constructed in accordance with the invention;

FIGURE 4 is a sectional view along the line 4—4 of FIGURE 3;

FIGURE 5 shows a concrete pipe having a facing or barrier applied with the apparatus of the invention and prior to curing;

FIGURE 6 is a fractional perspective view, partially broken away and in section, showing a cured concrete pipe having an integral, continuous interior facing applied with the apparatus of the invention;

FIGURE 7 is an embodiment of the overall apparatus of this invention, for effecting vertical traverse of the concrete pipe by the spraying head with the mixture being supplied automatically;

FIGURE 8 is a detailed illustration of a portion of FIGURE 7;

FIGURE 9 is an elevational view of another embodiment of the spinning equipment, partially in cross section;

FIGURE 10 illustrates, in elevation, partially in cross section, another embodiment of the spinning head equipment;

FIGURE 11 illustrates another overall embodiment of the total apparatus; and

FIGURE 12 illustrates, partially and cross section, a detail of the FIGURE 11 apparatus.

The apparatus of the present invention is particularly useful as a means for applying a facing composition similar to that disclosed and claimed in Whittier et al. Patent No. 2,765,288, and in accordance with the method disclosed and claimed in our copending application Serial No. 330,416, filed December 13, 1963. Briefly, the composition may be, for example, a mixture of coal tar pitch and epoxy resin, along with a filler, such as sand. According to the method in that application, the composition is applied to a wet uncured pipe in a way that the composition penetrates the interior surface of the pipe. The pipe later may then be cured by contact with air and steam.

Referring more specifically to FIGURES 1 and 2 of the drawings there is provided a boom 2 to which there is connected a gear box 4. The gears, such as gear 6, are driven by an air motor 8.

The boom 2 is positioned inside a wet, uncured, green, cylindrical concrete pipe (not shown). Through the center of the boom there is provided a conduit 10. A premixed facing composition is formed by pressure through conduit 10 into the cone 14 within the head 12 of the boom. The head 12 is connected to the drive shaft 20 by ribs 16.

By turning on the motor the entire head portion of the boom, including cone 14, is rotated rapidly, e.g., at 2000 r.p.m. The composition, as it emerges from the cone, escapes as indicated by the arrows and is broken up and flung back when it strikes the inner wall 22 of the head.

It slowly moves up that wall then, and up over the annular plate 24. The thus dispersed composition is then forced through the apertures in the cylindrical screen 26 which is secured to plate 24 by screws 28. The composition, when it is forced through the apertures, is impinged upon and impregnates the surface of the wet, green concrete pipe to form a facing layer which becomes smooth. It was observed that there was a distortion of the pipe surface due to the force of the impingement.

The boom is gradually retracted through the pipe so that the entire inner surface receives an integral facing of uniform thickness. The treated pipe is placed in a steam curing chamber, air cured for 3 hours and then put through the regular steam cure period, e.g., about 130° F. for 12 hours to cure both the concrete and the resin composition. (Alternatively, curing can be accomplished under normal atmospheric conditions in those geographic locations where high temperature and humidity prevail, e.g., Houston, Texas.)

FIGURES 3 and 4 show another apparatus utilizing a boom 34. The facing composition is forced under pressure through a conduit 36 in the boom. (Instead of using a single conduit 36, it is possible to employ two concentric conduits with the filler, for example sand, passing through one conduit and the balance of the composition through the other.) On the boom there is provided a gear box 38, the gears of which are driven by pulley 40 which, in turn, is connected to hydraulic motor 42.

The facing composition is forced by pressure through conduit 36 against the inverted V-portion 44 of the front end 46 or the head of the boom. When the motor is on, the entire forward section of the boom, including head 46, rotates rapidly, e.g., 2800 r.p.m., on bearings 48 and 50. The composition, as it hits the V-portion 44, is broken up and dispersed tangentially along the frusto-conical wall 51 of the head of the boom in the direction shown by the arrows, and is forced through the apertures in the cylindrical screen 54. A circular flange 58 extends from the outer edge or rim of the deep-dish-like head 46, i.e., from the upper end of wall 51, horizontally outward and screws 59 secure the screen thereto. The bolts 60 also secure the head 46 to a collar 62 which, in turn, is secured by bolts 64 to the lead portion 66 of the rotating shaft. Each bolt 60 is surrounded by a respective spacer sleeve 67. The boom is retracted through the pipe in the manner previously described.

As the composition is forced through the apertures 54 by centrifugal force, it impregnates the surface of the wet, uncured, green concrete pipe, e.g., a 24-inch diameter pipe, to form a facing layer. The pipe can be cured and the resin set in the manner previously set forth.

In the specific examples described in connection with FIGURE 3, the energy of the particles leaving the screen was 6.5 ft. lbs. per square inch of surface.

Sufficient energy must be imparted to the particles so that they strike the concrete surface with sufficient force to avoid air entrapment and to obtain penetration of the surface of the interior wall of the concrete pipe.

The apparatus described in either FIGURE 1 or FIGURE 3, has been found adequate to impart the desired force.

As shown in FIGURE 5, the resultant green, uncured concrete pipe 68 has a steel wire reinforcement cage 70 therein and an inner, integral, continuous facing layer 72 of pitch-epoxy resin.

FIGURE 6 shows a cured concrete pipe 74 having an interior facing layer 76 of cured epoxy resin. It will be noted as stated that the facing layer impregnates the porous surface of the concrete, is securely locked therein and presents an impervious, continuous surface to the contents of the pipe, e.g., sewage containing hydrogen sulfide.

The present invention is useful in facing pipes of 4, 8, 12, 24 or 144 inches internal diameter, for example, or any other desired diameter.

In the specific example the facing layer had a thickness of about 100 mils. Usually, the facing layer prepared according to the invention has a thickness of between 100 and 125 mils. However, for some uses the thickness can be as thin as 10 mils and can be as much as 300 or 400 mils or even greater.

Reference is now made to FIGURE 7, which shows one embodiment of an overall structure for smoothly facing the uncured, green concrete pipe 78. In this embodiment, the pipe is disposed on a platform 80 which has wheels 82 movable along the rails 84, in order to move the pipe 78 to and from a position in which it can be sprayed. The spinning head 86 is shown rather schematically in FIG. 7, but it may be similar to those shown in FIGURES 1 and 3 for example, or in accordance with spinning heads described below. As shown by the dash line 88, spinning head 86 is vertically movable from its upward solid line non-spraying position into its dotted line position in which spraying may start. It will be noted that in the start-spraying position, head 86 is sufficiently below the upper surface of platform 80 to prevent spraying of the concrete pipe until the head speed and spray have reached optimum conditions. To effect this, the platform has a central aperture 90 around and downwardly from which extends a spray shield 92. This shield may be of cardboard, or of any other material, which will protect the surrounding area from being sprayed undesirably. It is to be understood that the spraying is started while the head extends downwardly below the top of aperture 90 so that the lower surface of the interior of the concrete pipe gets sprayed as uniformly and evenly as the upper surfaces thereof.

In order to move the spray head up and down through the concrete pipe, the head is connected through a frame 94 to a cross brace 96 which has U-shaped brackets 98 at its opposite ends for traversing the vertical standards 100. A hydraulic cylinder or other type of motive means 102 is secured to the cross beam 104 which interconnects the standards 100 at their upper ends. This hydraulic cylinder has a piston 106 which extends through that cross beam and connects to the frame 94, for causing that frame and its connected spray head 86 to move vertically with the standards 100 being the guide tracks.

As the spray head is being moved upwardly from its dotted line position by virtue of operation of hydraulic cylinder 102 or any other means equivalent thereto, it is necessary to force the facing composition onto the rotating spinning disk. This is accomplished by operation of another cylinder 108, shown in greater detail in FIGURE 8. This cylinder has a piston rod 110 which is secured through the upper open end of a composition container 112 to a piston 114 therein, which has a rubber gasket 116 or the like surrounding its periphery for greater sealing effect. Container 112 rests on seats 118 and may be removed therefrom for cleaning and refill purposes when piston 114 is upwardly withdrawn from the container. At its bottom end, container 112 has a spigot 120 to which is detachably secured a pipe 122, which is preferably rigid, that is positioned into the upper open end of the pipe means in the spray head, such as into the conduit 36 of FIGURE 3.

Spray head 86 in FIGURE 7 may be constructed as shown in FIGURE 9, in which mounting brackets 128 secure a motor 130 which has a timing type pulley 132 secured to its output shaft. This pulley cooperates with a timing gear belt 134 to rotate the similar pulley 136, which is secured to the main body 138 of the spinning head by means of bolts 140. At its upper and lower ends, the spinning head body 138 is rotatably secured by ball bearings 142 and 144, to a hub 146. This hub extends upwardly with a threaded attachment 148, which is secured to the motor brackets 128 by means of bolts 150.

At the lower end of body 138 there is secured thereto an annular plate 147, with a ring 149 in between for purposes of protecting bearings and the like from sand or the mixture sprayed from the head. Several bolts 150 hold these items together. Extending downwardly from plate 147 are several bolts such as bolt 152 with respective spacers 154 to which are attached the main spin-off plate 156, by nuts 158. Plate 156 has a screen 160 secured to its outer rim by cap screws 162, and includes a central aperture 164. To the periphery of this central aperture is attached the rim 166 of a deep-dish element 168. Concentrically of the opening formed by hub 146, is a conically shaped diverter element 170, which points upwardly and extends threadingly downward through the bottom of the deep-dish element for securement thereto by nut 172 and washer 174.

As mentioned with regard to FIGURE 7, the composition is forced into the spray head via a rigid conduit 122. This conduit is shown in FIGURE 9 as extending into the aperture formed by hub 146, all the way down to a level substantially below the upper surface of plate 156. As in the other spray head embodiments, it is necessary for this feed tube 122 to extend downward through aperture 164, in order for the material fed thereby to effect a creeping or like slow movement up the sides of the deep-dish to cause an even flow-out effect over rim 166 and plate 156. In order for this centrifugal force to effect an even and uniform spray through screen 160 which aids in breaking up the material into a uniform spray, it is necessary that the composition fed into the deep-dish be uniformly distributed over the rim 166. This is accomplished by making sure the material is fed into the lower portion of the deep-dish, so that the material can only move up the sides of the deep-dish slowly. This makes a uniform distribution of the material as it passes over rim 166.

It will be noted that annular plate 147 in FIGURE 9 has a downward extension 176 that approaches the upper side of deep-dish 168 adjacent rim 166. This element 176 operates as a downward deflector of the material centrifugally forced against it. Accordingly, to get out, the material is required to come up the sides of the deep-dish through the valve-like opening between rim 166 and deflector 176, and this assures the desired uniform flow-out.

The spinning head in FIGURE 9 may be employed to receive the filler material or sand separately from the composition which enters via feed tube 122. It should be understood however, that the equipment of FIGURE 9 need not be employed as a mixer of the sand and resin composition, but instead the total mixture including the sand may be introduced through the pipe or feed tube 122 itself. When this latter situation is the case, the hub extension 178 need not be employed, but it is preferable to use this extension when sand is coming into the deep-dish area separately via the bore formed by hub 146. In this way, any sand that comes into the area below the bottom of hub 146 is not thrown outwardly by centrifugal force until it is in the deep-dish mixing area.

In the FIGURES 1, 3 and 9 embodiments, it was tacitly assumed that the filler material, e.g., sand, was already in the composition at it was forced into the upper end of the pipe or conduit of the spray head. In another arrangement, the filler is mixed into the composition in the vicinity of the spray head area, and two different spray heads of this nature are described below.

As another embodiment of the spinning head, preferred for separate mixing of the filler material internally of the head, reference is made to FIGURE 10. This figure illustrates the preferred embodiment of the spinning head equipment, and is quite similar to that of FIGURE 9, with a few modifications. Like parts in the two figures are given the same numerical designation and are not particularly re-described below as to FIGURE 10. The equipment in FIGURE 10 is especially constructed for use in the apparatus of FIGURE 11, though it also may be employed in the manner referred to relative to FIGURE 7. In FIGURE 10, a sand valve arrangement is included as is a sand control hopper. In the FIGURE 11 arrangement, a sand hopper 124 is disposed on the cross beam 96 and has a rigid sand feed conduit 126. In FIGURE 10 the sand feed conduit is directed to a sand control hopper 186 which has a sand control valve element 188 cooperating with the sloping side of the hub extension 148. In FIGURE 10, this valve element 188 is secured to an annular member or pipe 190 which surrounds the resin-pitch feed tube 122' for a short distance above the sand control hopper 186. At that point, pipe 190 has secured to it a set-bolt arrangement 192 by which the height of valve element 188 may be adjusted and secured.

Also in FIGURE 10, there are included over and above the FIGURE 9 spinning head, a plurality of vertically extending mixing vanes 194 fixed to the bottom of deep-dish element 168. These are disposed between the downward hub extension 178 and feed tube 122 at points around the periphery of the spreader boss or diverter cone 170. Each of the mixing vanes includes a vertical rod with a plurality of propellers as shown, and they may be employed as desired. They are preferable, but may be omitted. When used, they assist in mixing the sand with the resin and pitch composition.

As shown in FIGURE 11, in which parts like those in FIGURE 7 have the same numerical designation, the spray head equipment 196 of FIGURE 10 is secured by arms 198 to frame 94 in a manner similar to that shown in FIGURE 7. The frame and spray head equipment are moved vertically by cylinder 102 and its piston 106, with standards 100 being the guiding tracks for respective elements 98' which are movably affixed thereto. The embodiment shown in FIGURE 11 is particularly useful when the composition to be sprayed on the inner surface of a green pipe includes not only an epoxy resin and sand, but also a coal tar pitch. For purposes of premixing the resin and pitch, which may be respectively supplied via pumps 200 and 202 through conduits 204, 206, a pneumatically operated mixing chamber 208 is provided. A source of air 210 is connected by conduit 212 to a pneumatic motor 214 which rotates the rod 216 (FIGURE 12) and the plurality of propellers 218 attached thereto. The mixed resin and pitch are supplied to the spinning head via the feed tube 122' as previously indicated.

It was previously mentioned with regard to FIGURE 7 that the cart or platform 80 had a central aperture downward from which extended a cardboard or other type of protective shield 92, so that the surrounding areas would not be sprayed, due to the spray head being below the platform surface at the start-spray position to effect a more even and uniform spray throughout the height of the pipe. A similar type protective shield 220 may be inserted in the top end of the concrete pipe to prevent spraying the surrounding area and operators as the spray head exits upwardly from the pipe.

From the foregoing description of the apparatus of this invention, it is apparent that the invention provides for the object of effecting a smooth, even and uniform facing or barrier on the interior surface of a green, uncured concrete pipe, by causing a flow-out effect through the feature of the invention of the material being fed to the lower area of the deep-dish, thereby causing the material to move slowly up the sides of the deep-dish and over the rim thereof to the annular plate surrounding the deep-dish. The centrifugal force imparted to the deep-dish and plate, then forces the mixed composition out through a screen to effect the required uniform spray.

Several modifications of the invention have been described, and still further modifications will become apparent to those of ordinary skill in the art upon reading this disclosure. It is intended, however, that this disclosure be considered illustrative, and not limitative, the scope of the invention being defined by the appended claims.

What is claimed is:

1. Equipment for centrifugally spraying material all around in a first direction to effect a smooth facing of such material, comprising:

spin-off means, rotatable about a second direction axis perpendicular to said first direction and including a concentric annular flat plate, for causing said material to be centrifugally sprayed evenly, and generally in said first direction, from all around the spin-off means, said spin-off means including a screen member disposed around an outer edge of said flat plate, said screen member extending concentrically with said second direction axis for aiding breakup of said material into a uniform spray as the material centrifugally passes therethrough, said spin-off means further including a deep-dish-like element concentrically extending from said plate with its outer rim extending to the edge of an aperture in said plate, means for rotating said spin-off means rapidly so any of said material over said plate will be centrifugally sprayed as aforesaid with a desired impingement force on the object being faced, and means, including pipe means extending in said second direction through said plate aperture, for supplying said material into said deep-dish element at a level substantially beyond said plate to cause the material to be slowly moved by centrifugal force over the sides of said deep-dish element and therefore evenly over said rim and flat plate to effect a forceful but uniform spray through said screen member.

2. Equipment for centrifugally spraying material horizontally outwardly to effect a smooth facing of such material, comprising:

spin-off means, rotatable about a vertical axis and including a concentric annular flat plate, for causing said material to be centrifugally sprayed evenly, and generally in a horizontal direction, from all around the spin-off means, said spin-off means including a vertically extending apertured member disposed around and upwardly from the outer edge of said flat plate for aiding breakup af said material into a uniform spray as the material centrifugally passes therethrough, said spin-off means further including a deep-dish-like element concentrically extending below said plate with its upper rim extending to the edge of an aperture in said plate, means for rotating said spin-off means rapidly so any of said material over said plate will be centrifugally sprayed horizontally with desired impingement force on the object being faced, and means, including pipe means vertically extending through said plate aperture, for supplying said material into said deep-dish element at a level substantially below the upper surface of said plate to cause the material to be slowly moved by centrifugal force upwardly adjacent the sides of said deep-dish element and therefore evenly over said rim and flat plate to effect a forceful but uniform spray from said apertured member.

3. Equipment as in claim 2 wherein the lower end of said pipe means flares with the bottom rim thereof being adjacent to the side walls of said deep-dish-like element.

4. Equipment as in claim 2 and further including a conically shaped diverter element disposed in the bottom of said deep-dish element pointing upwardly and being coaxial with said pipe means to cause spreading of said material as it exits therefrom.

5. Apparatus for spraying the interior of green, uncured concrete pipe with a settable plastic including an epoxy resin comprising the equipment of claim 1 along with:

means for lowering said equipment into a spray-start position and for retracting the equipment upwardly at a given speed during the spray process, and means for moving said concrete pipe into a position concentric with said equipment and including a base plate with a central aperture through which said spin-off means downwardly extends when in its spray-start position whereby the lower inside surface of the concrete pipe gets fully sprayed uniformly as well as the further up portions thereof.

6. Equipment as in claim 5 including mounting structure and hub structure relatively rotatable therewith, one of said structures being stationary with the other being coupled to drive said spin-off means by said rotating means.

7. Equipment as in claim 6 wherein said hub structure is mounted internally of said mounting structure and has a central bore which is substantially coaxial with said vertical axis and through which said pipe means extends.

8. Equipment as in claim 7 wherein said bore of said hub is a feed tube for a first type of material and said pipe means supplies to said deep-dish element another type of material, which materials together make up the first mentioned material which is to be sprayed, there being means extending downwardly from the lower end of said hub to extend the feed tube through said plate aperture to a level lower than the upper surface of said plate, and means adjacent the upper end of said hub for regulating the amount of said first type of material to be fed into said deep-dish element through said feed tube.

9. Equipment as in claim 8 wherein the upper end of said hub flares outwardly, said regulating means including an element cooperative with the flared out hub portion to regulate the flow of said first type of material by varying the size of the opening therebetween through vertical adjustment of said regulating means.

10. Equipment as in claim 8 and further including a deflector adjacent the rim of said deep-dish element for preventing said material from being centrifugally thrown out of said deep-dish element except via said rim.

11. Equipment as in claim 8 and further including a conically shaped diverter element disposed at the bottom of said deep-dish element and pointing upward into and coaxial with said pipe means, and a plurality of mixing vanes extending vertically from the said bottom of said deep-dish element around said diverter element between said pipe means and feed tube extension.

12. Apparatus for spraying the internal surface of green, uncured concrete pipe to effect an integral facing, comprising:

a spray station including the equipment of claim 8, means for supplying sand through said feed tube, and means for supplying an epoxy resin material through said pipe means under pressure, whereby the sand and resin material are mixed in the area of said deep-dish element, so as to be centrifugally moved over the rim and said flat plate thereof and through the said screen member onto the internal surface of said concrete pipe while the said equipment is being moved upwardly through said concrete pipe.

13. Apparatus as in claim 12, for spraying a coal tar pitch and epoxy resin mastic on the internal surface of said concrete pipe, including:

means for supplying said coal tar pitch under pressure, means receiving said pitch and epoxy resin for mixing same together, and means connecting the output mixture from that mixing means to said pipe means for supplying the mixture to the area of said deep-dish element.

14. Equipment as in claim 13 and further including a conically shaped diverter element disposed at the bottom of said deep-dish element pointing upwardly concentric of said pipe means, there being a plurality of mixing vanes spacedly disposed around said diverting element and vertically extending between said pipe means and the said downward feed tube extension for mixing the sand into the said mixture as both come into the area of the deep-dish element.

15. Apparatus as in claim 13 and further including means at the upper end of said hub for regulating the amount of sand which may be fed by said feed tube.

16. Apparatus as in claim 12, including means for forcing said material into said pipe means as said equipment is retracted upwardly during the spraying process.

17. Equipment as in claim 2 including a deflector adjacent the rim of said deep-dish element for preventing said material from being centrifugally thrown out of said spin-off means except via said apertured member.

18. Equipment for centrifugally spraying a composition material horizontally outwardly to effect a smooth facing of such material on the inside face of a green, un-cured concrete pipe, comprising:

spin-off means, rotatable about a vertical axis and including a concentric annular flat plate, for causing said material to be centrifugally sprayed evenly, and generally in a horizontal direction, from all around the spin-off means, said spin-off means including a vertically extending screen member disposed around and upwardly from near the outer edge of said flat plate for aiding break-up of said material into a uniform spray as the material centrifugally passes therethrough, said spin-off means further including a deep-dish-like element having an inverted conically shaped inner surface concentrically extending a substantial distance downward and inward from a central aperture in said plate, means for rotating said spin-off means rapidly so any of said material over said plate will be centrifugally sprayed horizontally through said screen member with desired impingement force on the concrete pipe being faced, means, including pipe means vertically extending concentrically through said plate aperture, for supplying said composition material pre-mixed and centrally into said deep-dish element at a level substantially below the upper surface of said plate, and means circumferentially adjacent said inner surface for preventing said material from being centrifugally thrown out of said deep-dish element except by being moved by centrifugal force upwardly adjacent the sides of said deep-dish element and therefore evenly over said flat plate to effect a forceful but uniform spray from said screen member.

19. Equipment as in claim 18 including means for relatively moving said spin-off means and concrete pipe vertically at least during the said spraying of said concrete pipe.

References Cited by the Examiner
UNITED STATES PATENTS

| | | | |
|---|---|---|---|
| 1,838,546 | 12/1931 | Halstead | 25—38 |
| 2,233,855 | 3/1941 | Suss | 239—223 |
| 2,508,709 | 5/1950 | Goetchius | 118—317 X |
| 2,986,338 | 5/1961 | Foster | 239—222 |
| 2,992,778 | 7/1961 | Martin | 239—223 |
| 3,073,531 | 1/1963 | Kothe | 239—223 |
| 3,180,312 | 4/1965 | Handley et al. | 118—317 X |

DANIEL BLUM, *Primary Examiner.*